(12) United States Patent
Nieto Lara et al.

(10) Patent No.: US 11,606,895 B2
(45) Date of Patent: Mar. 21, 2023

(54) AUTOMATIC STEERING OF AN AGRICULTURAL MACHINE ON AN AGRICULTURAL SURFACE

(71) Applicant: ZF Friedrichshafen AG, Friedrichshafen (DE)

(72) Inventors: David Nieto Lara, Tettnang (DE); Zhihu Chen, Constance (DE); Anatol Weidenbach, Nonnenhorn (DE); Tim Haerle, Bad Waldsee (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 184 days.

(21) Appl. No.: 17/296,989

(22) PCT Filed: Nov. 27, 2019

(86) PCT No.: PCT/EP2019/082721
§ 371 (c)(1),
(2) Date: May 26, 2021

(87) PCT Pub. No.: WO2020/109376
PCT Pub. Date: Jun. 4, 2020

(65) Prior Publication Data
US 2022/0000005 A1    Jan. 6, 2022

(30) Foreign Application Priority Data
Nov. 28, 2018   (DE) ...................... 10 2018 220 410.1

(51) Int. Cl.
*A01B 69/00* (2006.01)
*A01B 69/04* (2006.01)
*G05D 1/02* (2020.01)

(52) U.S. Cl.
CPC .......... *A01B 69/008* (2013.01); *A01B 69/001* (2013.01); *G05D 1/0246* (2013.01); *G05D 1/0278* (2013.01); *G05D 2201/0201* (2013.01)

(58) Field of Classification Search
CPC ................................................... A01B 69/008
See application file for complete search history.

(56) References Cited

U.S. PATENT DOCUMENTS

| 4,211,921 A | 7/1980 | Kanetou et al. |
| 5,445,081 A * | 8/1995 | Kunczynski ............ B61B 13/00 104/168 |

(Continued)

FOREIGN PATENT DOCUMENTS

| CN | 101162395 A | 4/2008 |
| CN | 101674965 A | 3/2010 |

(Continued)

*Primary Examiner* — Shelley Chen
(74) *Attorney, Agent, or Firm* — Leydig, Voit & Mayer, Ltd.

(57) ABSTRACT

A method for automatically steering an agricultural machine on an agricultural area that is to be worked. The method includes optically detecting a first region of the area that is to be worked lying in a direction of travel of the agricultural machine in a first recording via a first optical sensor in a first position with a first viewing direction. The method further includes optically detecting a second region of the area that is to be worked lying in the direction of travel of the agricultural machine in a second recording via a second optical sensor in a second position with a second viewing direction. The method additionally includes detecting a tramline in the first recording and detecting a tramline in the second recording, determining a first trajectory and a second trajectory, and determining a steering signal based on the first trajectory and/or the second trajectory.

8 Claims, 2 Drawing Sheets

(56) References Cited

U.S. PATENT DOCUMENTS

| | | | |
|---|---|---|---|
| 5,911,669 A | 6/1999 | Stentz et al. | |
| 6,101,795 A | 8/2000 | Diekhans | |
| 7,591,226 B2 * | 9/2009 | Dix | A01C 7/087 |
| | | | 701/50 |
| 8,494,727 B2 * | 7/2013 | Green | A01B 79/005 |
| | | | 172/3 |
| 9,043,951 B2 * | 6/2015 | Tolstedt | G05D 1/021 |
| 10,028,442 B1 * | 7/2018 | Crosby | B60P 3/00 |
| 10,460,181 B2 | 10/2019 | Mayser | |
| 2008/0091318 A1 | 4/2008 | Deng et al. | |
| 2008/0105177 A1 * | 5/2008 | Dix | A01C 7/087 |
| | | | 111/200 |
| 2009/0204281 A1 * | 8/2009 | McClure | G05D 1/027 |
| | | | 701/25 |
| 2010/0009731 A1 * | 1/2010 | Goers | A01D 41/1217 |
| | | | 460/149 |
| 2010/0049375 A1 | 2/2010 | Tanimoto | |
| 2010/0063681 A1 | 3/2010 | Correns et al. | |
| 2012/0316745 A1 | 12/2012 | Futamura et al. | |
| 2012/0323452 A1 * | 12/2012 | Green | A01B 79/005 |
| | | | 701/50 |
| 2013/0173115 A1 | 7/2013 | Gunia et al. | |
| 2015/0025752 A1 * | 1/2015 | Tolstedt | A01C 7/087 |
| | | | 701/50 |
| 2021/0267115 A1 * | 9/2021 | Fjelstad | G05D 1/0219 |

FOREIGN PATENT DOCUMENTS

| | | |
|---|---|---|
| CN | 102753409 A | 10/2012 |
| CN | 103183028 A | 7/2013 |
| CN | 104699085 A | 6/2015 |
| CN | 107107909 A | 8/2017 |
| DE | 19719939 A1 | 11/1998 |
| DE | 69709482 T2 | 11/2002 |
| DE | 102006055858 A1 | 5/2008 |
| DE | 102010049215 A1 | 7/2011 |
| DE | 102013224791 A1 | 6/2015 |
| DE | 102016209437 A1 | 11/2017 |
| EP | 1473673 A2 | 11/2004 |
| EP | 2368419 A1 | 9/2011 |
| EP | 3165406 A1 | 5/2017 |
| JP | 2009153432 A | 7/2009 |

* cited by examiner

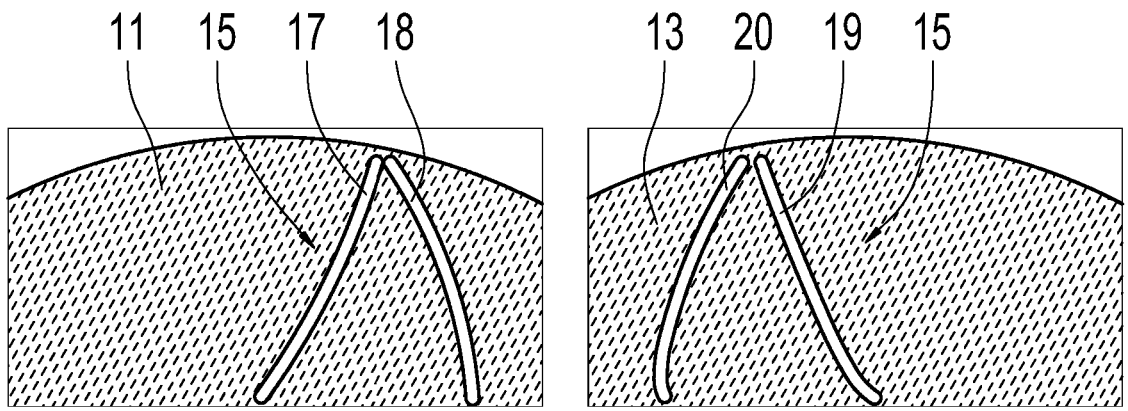
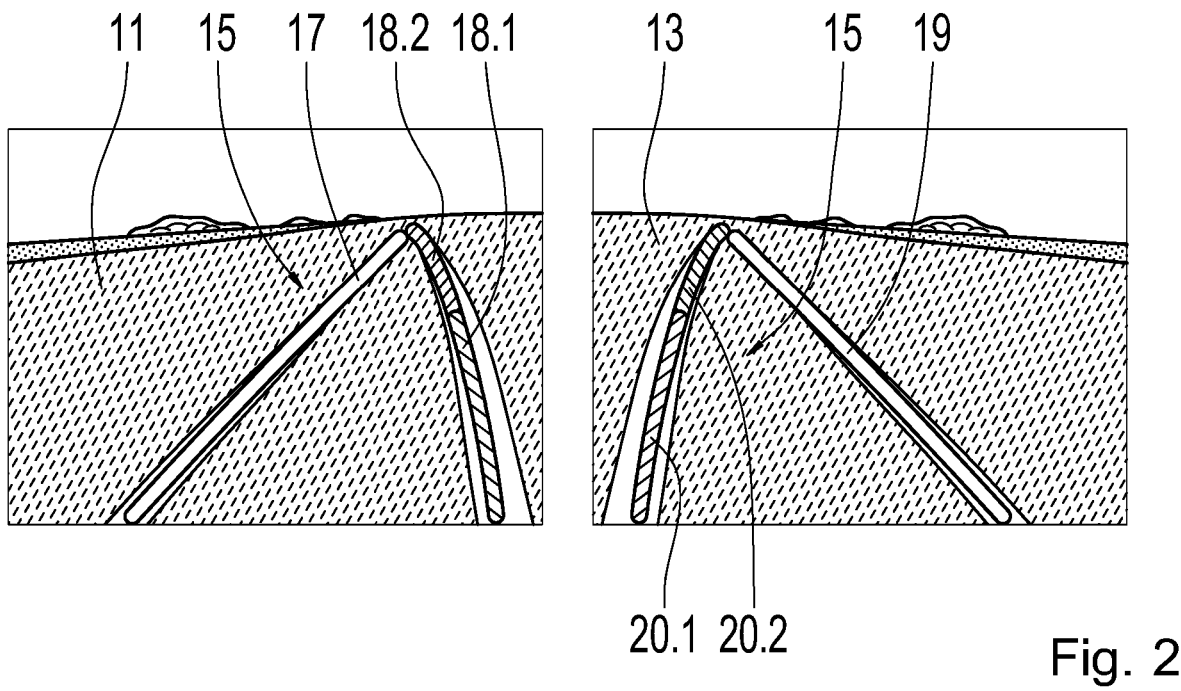
Fig. 1
Fig. 2
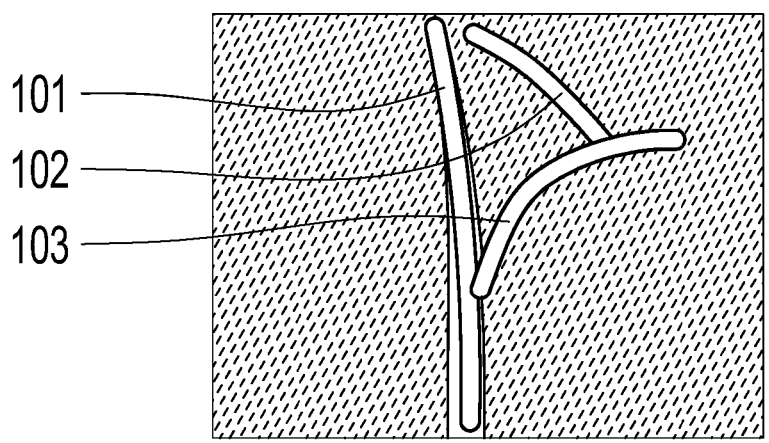
Fig. 3

AUTOMATIC STEERING OF AN AGRICULTURAL MACHINE ON AN AGRICULTURAL SURFACE

CROSS REFERENCE TO RELATED APPLICATIONS

This application is a U.S. National Phase application under 35 U.S.C. § 371 of International Application No. PCT/EP2019/082721 (WO 2020/109376 A1), filed on Nov. 27, 2019, and claims benefit to German Patent Application No. DE 10 2018 220 410.1, filed on Nov. 28, 2018.

FIELD

The present disclosure relates to a method for automatically steering an agricultural machine on an agricultural area to be worked, and to a control unit for steering an agricultural machine.

BACKGROUND

DE 10 2016 209 437 A1 shows an automatic steering system for guiding an agricultural vehicle across a field.

SUMMARY

In an embodiment, the present disclosure provides a method for automatically steering an agricultural machine on an agricultural area that is to be worked. The method includes optically detecting a first region of the area that is to be worked lying in a direction of travel of the agricultural machine in a first recording via a first optical sensor in a first position with a first viewing direction. The method further includes optically detecting a second region of the area that is to be worked lying in the direction of travel of the agricultural machine in a second recording via a second optical sensor in a second position with a second viewing direction. The method additionally includes detecting a tramline in the first recording and detecting a tramline in the second recording, determining a first trajectory based on the determined tramline in the first recording, determining a second trajectory based on the determined tramline in the second recording, and determining a steering signal, via which the machine is steered along the tramline, based on the first trajectory and/or the second trajectory.

BRIEF DESCRIPTION OF THE DRAWINGS

Subject matter of the present disclosure will be described in even greater detail below based on the exemplary figures. The invention defined by the following claims is not limited to the exemplary embodiments. All features described and/or illustrated herein can be used alone or combined in different combinations. The features and advantages of various embodiments will become apparent by reading the following detailed description with reference to the attached drawings, which illustrate the following:

FIG. 1 provides a schematic example of a processing step according to an embodiment;

FIG. 2 provides a schematic example of a processing step according to an embodiment;

FIG. 3 provides a schematic example of a processing step according to an embodiment;

DETAILED DESCRIPTION

Figure 4:
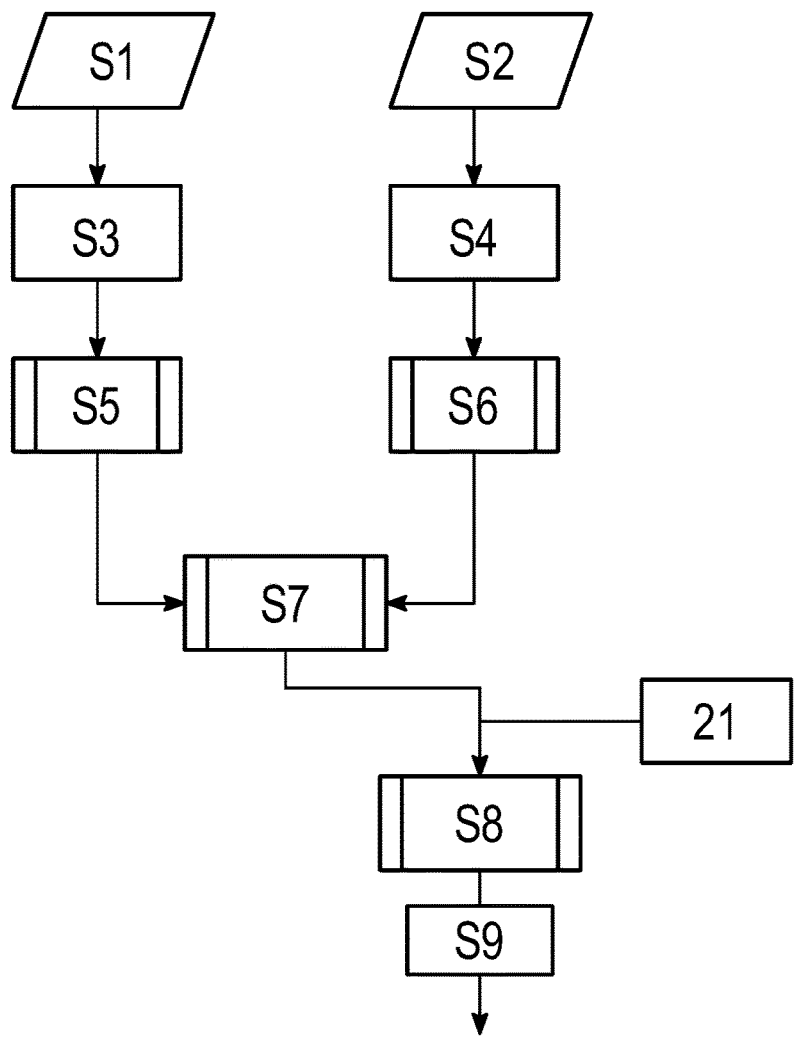
FIG. 4 provides a schematic block diagram of an embodiment.

The present disclosure provides a more precise method and system for automatically steering an agricultural machine.

A method is provided for automatically steering an agricultural machine on an agricultural area that is to be worked, the method comprising the following steps: optically detecting a region of the area situated in the direction of travel of the machine in a first recording, by means of a first optical sensor in a first position with a first viewing direction; optically detecting a region of the area situated in the direction of travel of the machine in a second recording, by means of a second optical sensor in a second position with a second viewing direction; detecting a tramline in the first recording and in the second recording; determining a first trajectory on the basis of the determined tramline in the first recording; determining a second trajectory on the basis of the determined tramline in the second recording; determining a steering signal by means of which the machine is controlled along the tramline on the basis of the first and/or the second trajectory.

A control unit is provided for steering an agricultural machine, having a first optical sensor, a second optical sensor, a data storage, a computing unit, and also having an interface to a steering system of the agricultural machine, wherein the first optical sensor is arranged symmetrical to the second optical sensor with respect to a longitudinal axis, vertical axis, and/or transverse axis of the machine; wherein the first optical sensor and the second optical sensor are configured to create recordings of an area in the direction of travel of the agricultural machine, the data storage is configured to store the recordings, and the computing device is configured to determine a trajectory for steering the agricultural machine based on the recordings and is configured to determine a steering signal for steering the agricultural machine based on the determined trajectory.

The goal of agriculture is the purposeful production of vegetable or animal products on an area that is cultivated for this purpose. In this patent application, the term "agriculture" also encompasses forestry.

Agricultural machines are, for example, agricultural vehicles, e.g. tractors, feller-processors, harvesting machines such as combine harvesters, and the like.

Agricultural areas are, for example, cultivated fields, farmland, beds, or woodland.

Optical sensors are cameras, for example. A detection of an object is a recording of an object. For example, the recording of a building with a camera is a detection of the building. An optical sensor which generates an image recording has a viewing angle and a viewing direction. The viewing direction can be specified as a reference vector of the viewing angle, e.g. the bisector of the viewing angle, and can be set via the roll angle, yaw angle, and/or pitch angle of an optical sensor.

The term "tramline" refers to the part of an agricultural area that is driven on while the crop is growing. Usually, the strips that are driven on are not sown in order to save seed. In cereal fields, for example, hardly any cereal crops are thus damaged by tires. Tramlines are usually laid out in parallel and separated by 10 to 36 meters. This depends primarily on the equipment present during operation. Field sprayers and fertilizer spreaders in particular determine the distance between the tramlines via their working widths. It can be problematic if cereal plants recover after being driven over.

Tramlines often have two tracks, which in agriculture are often formed as depressions in the ground. Depending on the viewing direction towards a track, the distance of a detecting sensor from the track, and the vegetation height of the surroundings of the track, tracks are often detectable as edges, shadows, or color differences in an image.

A trajectory, also referred to as a leg, a path, or a route, is the progression of a spatial curve or surface curve along which a body or a point, for example the center of gravity of a rigid body, moves.

Three translational movements in the direction of the main axes are considered as the spatial movement of bodies, namely longitudinal movement along the longitudinal axis, transverse movement along the transverse axis, and vertical movement along the vertical axis, often combined with the longitudinal movement when driving downhill or uphill. Lifting platforms, for example, implement a purely vertical movement. Furthermore, the three rotational movements about the three main axes, namely yawing about the vertical axis, pitching about the transverse axis, and rolling about the longitudinal axis, are also considered.

Plausibilization, also referred to as validation or inspection, is a method in the scope of which a value or a result is checked as to whether it can be at all plausible, that is to say acceptable, evident, and comprehensible, or whether it is to be assumed that the value or the result is flawed. For a plausibilization, it may be sufficient to resort to less accurate data or to reduced computational accuracy.

An interface is a device between at least two functional units, at which device an exchange of logical values, for example data, or physical values, for example electrical signals, takes place, either only unidirectionally or bidirectionally. The exchange can be an analog or digital exchange. The exchange can also be wired or take place wirelessly.

Position systems serve for position estimation, that is to say the estimation of a location in relation to a defined fixed point. GPS (Global Positioning System) is an example of a positioning system.

Determining positions on the basis of satellite positioning systems, such as GPS, takes place by evaluating signal propagation times between the satellites to be received and the respective receiver that is to be located on the ground. Measurement of the signal propagation times is subject to random and systematic fluctuations or errors. For example, the number and arrangement of visible satellites, changing atmospheric conditions, and buildings on the ground will affect measurement. As a result, it is therefore not possible to determine a precise point on the earth, but rather an area in which this point is probably situated. The stronger the negative effects, the larger this area will be, i.e. the more imprecise that the determination of the sought coordinates will be. For this reason, the satellite positioning that has been used so far is often inadequate for position estimation.

Position determination in relation to environmental features is also referred to as "simultaneous localization and mapping", or SLAM for short.

If a body is detected at a known position, a position estimation can also take place on the basis of a body's registered own movement.

The idea on which the present disclosure is based is to detect, by means of two optical sensors, a tramline of an agricultural area that is to be traveled over, wherein the optical sensors have known and different positions. Due to the different positions of the optical sensors, the tramline in the first recording of the first optical sensor has optical features or characteristics that are different from those of the tramline in the second recording of the second optical sensor. The disclosure provides for detecting a tramline in the first or second recording and determining a first or second trajectory therefrom. The trajectory serves for path guidance of the agricultural machine.

Although, in the ideal case, only one recording is required for determining a trajectory along which the agricultural machine is to be steered, by means of the second recording, the reliability of a method for automatically steering an agricultural machine can be improved.

When used in an agricultural area, it frequently occurs that the trajectory cannot be reliably determined from the first recording, for example due to solar radiation or other unfavorable weather conditions, or due to a dirty optical sensor. In this instance, the disclosure provides for determining a second trajectory in a second recording.

Optionally, the embodiments and developments also make it possible to further process the first trajectory on the basis of the second trajectory, for example to plausibilize it, or to determine a trajectory interpolating the first trajectory and the second trajectory.

According to a preferred development, the first trajectory is plausibilized by means of the second trajectory. Alternatively or additionally, it can also be provided that the second trajectory is plausibilized by means of the first trajectory. When used in the field, optical features in a recording of an optical sensor often cannot be uniquely assigned due to perspective distortions. Since the features by means of which a tramline is detectable in a recording depend on the viewing direction or on the perspective of the optical sensor, a tramline in the first recording can often be detected on the basis of other features than in the second recording.

According to a preferred development, the first optical sensor is arranged symmetrical to the second optical sensor with regard to a longitudinal axis, vertical axis, and/or transverse axis of the machine. The symmetrical arrangement of the optical sensors reduces the computational effort of a method for automatically steering an agricultural machine, since the different positions of the optical sensors do not need to be calculated from the two recordings or are easy to calculate due to symmetry properties. It is to be assumed that the tramline in the first recording is mapped mirror-inverted in relation to the tramline in the second recording. If a tramline has two tracks, the two recordings can be merged in that the designation of the tracks is swapped.

According to a preferred development, the first trajectory and/or the second trajectory are plausibilized by means of additional position data of the machine. The determined trajectory can thus be checked.

It is thereby additionally expedient if the additional position data are based on a GPS signal and/or on a registered own movement of the machine. Although GPS signals are often inaccurate, the accuracy of a measurement of the GPS signal can be determined, however, so that a GPS signal can be resorted to if the signal has sufficient accuracy. If the GPS signal subsequently deteriorates, the position of the agricultural machine can also be estimated on the basis of the registered own movement of the machine which was registered after acquisition of the sufficiently accurate GPS signal.

Alternatively, it can also be provided that, for instance, a parking space of the agricultural machine is known, and the position estimation is estimated on the basis of the known parking space and the registered own movement of the machine.

It goes without saying that vegetation height can be detected with sensory means, for example, or alternatively estimated, for example on the basis of a date or on the basis of a season.

According to a preferred development, the first optical sensor and the second optical sensor are configured to detect a tramline having a first track and a second track. Tramlines in an agricultural area frequently have two tracks. Although it is also possible to detect a two-track tramline solely by means of one track, the result of the detected trajectory of the tramline can nevertheless be improved or made more precise if the agricultural machine is steered on the basis of the first and the second detected tracks.

It is thereby furthermore advantageous if the first track is detected as a track by the first optical sensor and the second track is detected by the first optical sensor on the basis of an edge in the first recording, and/or on the basis of a color difference in the first recording. Accordingly, it can be provided that the second track is detected as a track by the second optical sensor and the first track is detected by the second optical sensor on the basis of an edge in the second recording, and/or on the basis of a color difference in the second recording.

This improves in particular the accuracy of the method for automatic steering given greater vegetation heights, if the second track can be detected by the first optical sensor solely on the basis of color differences or edges.

The accompanying drawings are intended to impart a further understanding of the embodiments. They illustrate embodiments and, in conjunction with the specification, serve to explain principles and concepts. Other embodiments and many of the advantages mentioned will become apparent in view of the drawings. The elements of the drawings are not necessarily shown to scale relative to each other.

In the accompanying drawings, identical, functionally identical, and identically acting elements, features, and components are provided with the same reference symbols, unless stated otherwise.

FIG. 1 shows a first recording 11 of a first optical sensor 51 and a second recording 13 of a second optical sensor 53. The first optical sensor 51 and the second optical sensor 53 are attached to the front of an agricultural machine. The optical sensors 51 and 53 are mounted symmetrically and at the same height, and they respectively have the same yaw angle, pitch angle, and roll angle. Accordingly, the first recording 11 and the second recording 13 in FIG. 1 are axially symmetrical with respect to each other.

In FIG. 1 it is also shown that a tramline 15 has been detected by means of a method for automatically steering an agricultural machine. The tramline 15 comprises two tracks, namely a right-hand track and a left-hand track. Accordingly, a first trajectory 17 of the left-hand track and a first trajectory 18 of the right-hand track were detected in the first recording 11 by means of the method for automatically steering an agricultural machine. Furthermore, a second trajectory 19 of the right-hand track and a second trajectory 20 of the left-hand track were detected in the second recording 13 by means of the method. The track detection takes place via a deep neural network trained by means of "semantic segmentation" in a monitored learning method. Semantic segmentation is a method for categorizing pixels or regions in images depending on what information the pixel or region contains, that is to say, depending on what is shown by the pixel/region.

It can also be seen from FIG. 1 that the two tracks of the tramline 15 have been categorized according to their position in relation to the first or second optical sensor 51 or 53, respectively. Accordingly, the first trajectories 17, 18 in the first recording 11, or the second trajectories 19, 20 in the second recording 13, that was produced by the first sensor 51 are also categorized with regard to their position relative to the first sensor 51 or to the second sensor 53. Due to the symmetry properties of the first recording 11 and of the second recording 13, categorization of the first trajectories 17, 18 of the first recording 11 corresponds to a reversal of the categorization of the second trajectories 19 and 20 of the second recording 13. Accordingly, the second trajectory 20 of the left-hand track in the second recording 13 is associated with the same category as the first trajectory 18 of the right-hand track in the first recording 11, and the second trajectory 19 of the right-hand track in the second recording 13 is associated with the same category as the first trajectory 17 of the left-hand track in the first recording 11.

In FIG. 1, the tracks of the tramline 15 are clearly detectable by the optical sensors 51, 53. This results from a relatively low vegetation height, and also from the fact that the track edges have clear contours since no crops are growing within the tracks themselves. Due to the clear detectability of the tracks, the tracks in FIG. 1 have been associated by the method only into two categories with regard to their position relative to the respective sensor 51, 53.

FIG. 2 shows a further first recording 11 and a further second recording 13 similar to the recordings according to FIG. 1. In contrast to FIG. 1, the tracks of the tramline 15 are less clearly visible in FIG. 2 since the vegetation height in FIG. 2 is higher than the vegetation height in FIG. 1, and in addition the contours of the tracks are less clear than in FIG. 1 since the tracks in FIG. 2 are partially overgrown with plants.

It emerges from FIG. 2 that the left-hand track in the first recording 11 was clearly detectable for the first sensor 51, and accordingly a first trajectory 17 at the track has been determined and has been categorized according to its position relative to the first sensor 51. The right-hand track is also clearly detectable for the second sensor 53 in the recording 13. For this track, the second trajectory 19 has been determined by the method for automatically steering an agricultural machine. Insofar as the entire track is clearly detectable for the first sensor 51 or for the second sensor 53 in the first recording 11 or in the second recording 13, the entire track is categorized uniformly.

However, the right-hand track is less clearly detectable for the first sensor 51 in the first recording 11, and the left-hand track less clearly detectable for the second sensor 53 in the second recording 13. For these tracks, a first trajectory 18 having a first section 18.1 and a second section 18.2 was determined in the first recording 11, and a second trajectory 20 having a first section 20.1 and a second section 20.2 was determined in the second recording 13. The first section of the trajectory 18.1 or 20.1 was relatively clearly detectable for the method. Accordingly, the first section 18.1 of the first trajectory 18 in the first recording 11 and the first section 20.1 of the second trajectory 20 in the second recording 13 are categorized according to their detectability and according to their position relative to the optical sensor 51 or 53 which created the respective recording 11 or 13. In contrast, the second section 18.2 of the first trajectory 18 in the first recording 11 and the second section 20.2 of the second trajectory 20 in the second recording 13 were less clearly detectable for the method for automatically steering an agricultural machine. Accordingly, the second section 18.2 and 20.2 is categorized according to the position relative to the respective sensor 51 or 53 in the first recording 11 or in the second recording 13, and according to the clarity of detectability, thus here a reduced clarity. A higher uncertainty or a higher susceptibility to errors of the detected track results from the lower detectability of the second section 18.2 or 20.2. As a result, the method will attempt to further plausibilize the detected track sections 18.2 and 20.2.

FIG. 3 shows tramline recognition in an intersection area. The recording according to FIG. 3 has been generated by a first sensor 51. Accordingly, the tracks or track sections 101, 102, and 103 are categorized according to their position in relation to the first optical sensor 51. The tracks or track sections 101, 102, and 103 are further categorized with regard to their detectability and with regard to the course of the tramline. Accordingly, the tracks 101, 102, and 103 are categorized on the basis of their detectability and position in relation to the sensor, but also with regard to the course of the tramline if there are several tramlines or several tracks to choose from. Accordingly, detected tramlines are also categorized as to whether a detected tramline is to be driven immediately or not.

FIG. 4 shows a block diagram of a method for automatically steering an agricultural machine. In step S1, a region of an area that lies in the direction of travel of the machine is optically detected in a first recording 11 by means of a first optical sensor 51 in a first position, having a first viewing direction. In step S2, a region of an area that lies in the direction of travel of the machine is optically detected in a second recording 13 by means of a second optical sensor 51 in a second position, having a second viewing direction. In step S3, a tramline 15 is detected in the first recording 11. In step S4, a tramline 15 is detected in the second recording 13. In step S5, a first trajectory 17 is determined on the basis of the detected tramline 15 in the first recording 11. In step S6, a second trajectory 19 is determined on the basis of the detected tramline 15 in the second recording 13. In step S7, the first trajectory 17 is plausibilized by means of the second trajectory 19. In step S8, the first trajectory 17 is plausibilized by means of additional position data of the machine, as well as on the basis of a registered own movement 21. In step S9, a steering signal by means of which the machine is steered along the tramline 15 is determined on the basis of the first trajectory 17 and the second trajectory 19.

Insofar as a tramline 15 has a plurality of tracks, a plurality of first trajectories 17, 18 or a plurality of second trajectories 19, 20 will respectively be determined.

Figure 5:
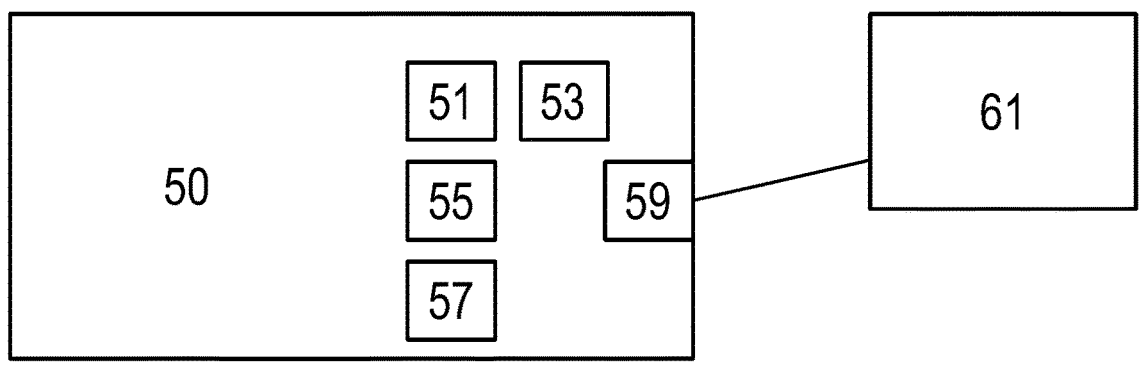
FIG. 5 provides a schematic block diagram of an embodiment.

FIG. 5 shows a control unit 50 having a first optical sensor 51, a second optical sensor 53, a data storage 55, a computing unit 57, and also an interface 59 to a steering system 61 of the agricultural machine.

While subject matter of the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the invention defined by the following claims may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for automatically steering an agricultural machine on an agricultural area that is to be worked, the method comprising:
   optically detecting a first region of the area that is to be worked lying in a direction of travel of the agricultural machine in a first recording via a first optical sensor in a first position with a first viewing direction;
   optically detecting a second region of the area that is to be worked lying in the direction of travel of the agricultural machine in a second recording via a second optical sensor in a second position with a second viewing direction;
   detecting a tramline in the first recording and detecting a tramline in the second recording;
   determining a first trajectory based on the determined tramline in the first recording;
   determining a second trajectory based on the determined tramline in the second recording; and
   determining a steering signal, via which the machine is steered along the tramline, based on the first trajectory and/or the second trajectory.

2. The method according to claim 1, wherein the first trajectory is plausibilized via the second trajectory, and/or the second trajectory is plausibilized via the first trajectory.

3. The method according to claim 1, wherein the first optical sensor is arranged symmetrical to the second optical sensor with regard to a longitudinal axis, vertical axis, and/or transverse axis of the machine.

4. The method according to claim 3, wherein the viewing direction of the first optical sensor is mirrored on the longitudinal axis, vertical axis, and/or transverse axis of the machine with respect to the viewing direction of the second optical sensor.

5. The method according to claim 1, wherein the first trajectory and/or the second trajectory are plausibilized by means of additional position data of the machine.

6. The method according to claim 5, wherein the additional position data are based on a GPS signal and/or on a registered own movement of the machine.

7. The method according to claim 1, wherein the first optical sensor and the second optical sensor are configured to detect a tramline having a first track and a second track.

8. The method according to claim 7, wherein the first track is detected as a track by the first optical sensor and the second track is detected by the first optical sensor based on an edge in the first recording and/or based on a color difference in the first recording.

\* \* \* \* \*